(No Model.)
J. KRUESI & J. LANGTON, Jr.
UNDERGROUND ELECTRICAL CABLE.
No. 334,708. Patented Jan. 19, 1886.
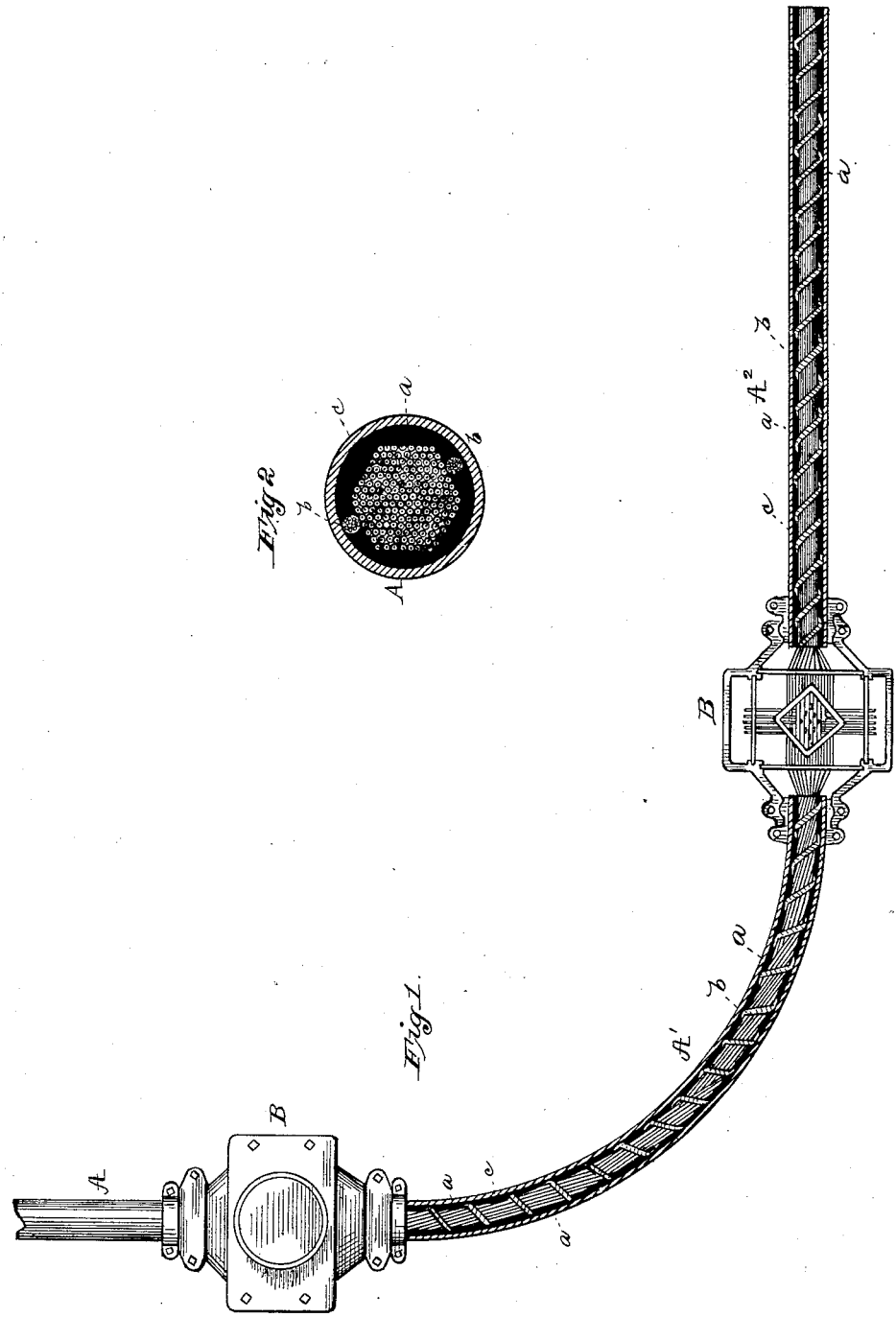

United States Patent Office.

JOHN KRUESI, OF BROOKLYN, AND JOHN LANGTON, JR., OF NEW YORK, N. Y.

UNDERGROUND ELECTRICAL CABLE.

SPECIFICATION forming part of Letters Patent No. 334,708, dated January 19, 1886.

Application filed June 23, 1885. Serial No. 169,494. (No model.)

*To all whom it may concern:*

Be it known that we, JOHN KRUESI, a citizen of the United States, residing at Brooklyn, in the county of Kings and State of New York, and JOHN LANGTON, Jr., a subject of the Queen of Great Britain, residing at New York, in the county and State of New York, have jointly invented a certain new and useful Improvement in Underground Electrical Conductors, of which the following is a specification.

This invention relates to systems of underground conductors in which cables, each composed of a number of insulated wires massed together, are placed in inclosing-tubes, the lengths of tubing being connected together by suitable coupling-boxes.

In laying a line of conductors of this character it is necessary or desirable at many places along the line to employ curved tubes—usually in turning a corner from one street into another. Where the cable inclosed within the tube is composed of a large number of wires closely packed together, it is difficult to bend it so that it can be placed in the curved or bent tube, because in bending such a cable the inner wires will bulge out of place, and the outer wires are stretched so that they are likely to break.

To remedy this difficulty is the object of our invention, and this we accomplish by twisting those lengths of cable which are to go in the bent tubes, giving the cable one or more complete turns, so that the wires assume the same positions relative to each other at both ends of the cable. When the cable is thus twisted it can be readily bent.

Our invention is illustrated in the annexed drawings, in which Figure 1 is a top view of a line of underground conductors embodying said invention, with the inclosing-tubes in horizontal section, and Fig. 2 a cross section of a tube inclosing a cable.

A, A', and A² are sections of tubing, preferably of iron. They are united by coupling-boxes B B—such as are set forth in the application of the said John Kruesi, Serial No. 148,283—the wires being interwoven in each box to neutralize induction, and the wires coming from opposite directions being bent out toward the sides of the box and there connected together; or the coupling-boxes may be of any other suitable character. Tubes A and A² are straight and tube A' is bent, the line of conductors here turning the corner formed by the intersection of two streets. In each section of tubing is a cable formed of a large number of separately-insulated wires, $a\ a$, massed compactly together in hexagonal form and wound spirally with rope, $b$, which forms a support for holding the cable centrally in the tube, said tube being filled with insulating material, $c$. In the cable employed with the straight tubes A and A² the wires are all straight, they being drawn together through a hexagonal die, and thus massed into a compact form with all the wires constantly in the same relative positions; but for the bent tube A', for the reason above set forth, the cable is twisted one or more times after passing through the hexagonal die, the twists being each complete turns, so that the wires at one end of the cable are in the same positions relative to one another as they were at the other end. This is desirable, because, as stated, the wires are interwoven in the coupling-boxes, and the wires can be readily distinguished from each other for this purpose only by being in the same position at the opposite ends of the tube.

What we claim is—

The combination, in a line of underground conductors, of straight tubes inclosing straight cables and bent tubes inclosing cables having one or more complete twists, so that the wires are in the same positions at opposite ends of said twisted cables, substantially as set forth.

This specification signed and witnessed this 10th day of June, 1885.

JOHN KRUESI.
JOHN LANGTON, JR.

Witnesses:
CHRISTOPHER ZAHN,
BENSON J. WILLIAMS.